US008848512B2

(12) United States Patent
Qin et al.

(10) Patent No.: US 8,848,512 B2
(45) Date of Patent: Sep. 30, 2014

(54) RENDEZVOUS POINT CONVERGENCE METHOD AND APPARATUS

(71) Applicant: Huawei Technologies Co., Ltd., Shenzhen (CN)

(72) Inventors: Yu Qin, Nanjing (CN); Junjun Song, Nanjing (CN); Youxi Lin, Nanjing (CN); Qinghui Meng, Nanjing (CN); Zhikun Huo, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/011,319

(22) Filed: Aug. 27, 2013

(65) Prior Publication Data

US 2014/0146659 A1 May 29, 2014

(30) Foreign Application Priority Data

Nov. 23, 2012 (CN) .......................... 2012 1 0483006

(51) Int. Cl.
*H04L 12/16* (2006.01)
*H04L 12/18* (2006.01)
*H04L 12/761* (2013.01)
*H04L 12/24* (2006.01)

(52) U.S. Cl.
CPC ........ *H04L 41/0668* (2013.01); *H04L 12/1877* (2013.01); *H04L 45/16* (2013.01)
USPC ...................................................... 370/218

(58) Field of Classification Search
CPC ......... H04L 12/16; H04L 29/02; H04L 12/18; H04L 12/56
USPC .......................... 370/400, 342, 218, 219, 220
See application file for complete search history.

(56) References Cited

U.S. PATENT DOCUMENTS

2003/0193958 A1* 10/2003 Narayanan .................... 370/400
2006/0182049 A1* 8/2006 Rokui ........................... 370/312
2006/0291444 A1* 12/2006 Alvarez et al. ................ 370/351

FOREIGN PATENT DOCUMENTS

EP 1052803 A2 11/2000

OTHER PUBLICATIONS

Network Working Group, RFC #2362 titled protocol independent multicast-sparse mode (PIM-SM): protocol specification, 1998.*
Extended European Search Report in corresponding European Patent Application No. 13173500.3 (Aug. 20, 2013).
1st Office Action in corresponding European Patent Application No. 13173500.3 (Aug. 27, 2013).
Fenner et al., "Protocol Independent Multicast—Sparse Mode (PIM-SM): Protocol Specification (Revised)," Internet draft, Network Working Group, IETF (Oct. 27, 2011).

* cited by examiner

*Primary Examiner* — Thai Nguyen
(74) *Attorney, Agent, or Firm* — Leydig, Voit & Mayer, Ltd.

(57) ABSTRACT

The present invention discloses a rendezvous point convergence method and apparatus and relates to the field of communications, to solve a problem that an entire network cannot work normally for a long time because a network device cannot send a candidate RP advertisement message to a bootstrap router BSR when the network device served as a rendezvous point RP is entirely faulty. In the present invention, when a route of an original working RP is unreachable, a first node receives a bootstrap message sent by a BSR, where Holdtime of the original working RP carried in the bootstrap message is 0; and the first node disables the original working RP and enables a candidate RP as a new working RP according to the bootstrap message. The present invention is applicable to the field of communications to implement rendezvous point convergence.

4 Claims, 4 Drawing Sheets

RENDEZVOUS POINT CONVERGENCE METHOD AND APPARATUS

CROSS-REFERENCE TO THE RELATED APPLICATION

This application claims priority to Chinese Patent Application No. 201210483006.X, filed on Nov. 23, 2012, which is hereby incorporated by reference in its entirety.

TECHNICAL FIELD

The present invention relates to the field of communications, and in particular, to a RP (Rendezvous Point) convergence method and apparatus.

BACKGROUND

PIM-SM (Protocol Independent Multicast-Sparse Mode) is a protocol that can route an IP packet to an extensive network multicast group effectively. The protocol performs topology discovery without depending on any specific unicast routing protocol, and is primarily applied in a multicast network of a sparse group. Generally, in a PIM-SM network, a network device is selected as an RP of the PIM-SM network. When a member device in the PIM-SM network needs to obtain a multicast data stream, the member device sends a join message to the RP to join a shared tree (that is, a multicast distribution tree established by member devices). A multicast source sends the multicast data stream to the RP through unicast, then the RP sends the multicast data stream to each member device along the shared tree.

To ensure normal working of the PIM-SM network, reliability of the RP needs to be improved. Generally, multiple network devices are configured as RPs in the PIM-SM network, including one working RP and multiple candidate RPs. For example, a network device 1 is a working RP, and a network device 2, a network device 3, and a network device 4 are candidate RPs. When an interface at which an RP on the network device 1 is located is faulty, the network device 1 may send a Candidate-RP-Advertisement to a BSR (Boot-Strap Router) through another interface, where HoldTime in the Candidate-RP-Advertisement is 0, so as to indicate that the network device 1 times out. After receiving the Candidate-RP-Advertisement, the BSR instructs other network devices in the PIM-SM network to delete a saved original working RP (that is, the network device 1) and enable a new working RP (the network device 2, the network device 3, or the network device 4), so as to ensure normal working of the PIM-SM network. The process of deleting the original working RP that is faulty and enabling a candidate RP as a new working RP is RP convergence.

In the process of implementing the present invention, the inventor finds that the prior art has at least the following problems:

When a network device served as an RP is entirely faulty (for example, the network device restarts, or all interfaces of the network device are faulty), the network device cannot send a candidate RP advertisement message to the BSR, and other network devices do not enable a candidate RP as a new working RP until a saved original working RP has aged. The aging of the RP is time-consuming, so that an available RP does not exist in the network for a long time, thereby causing that the entire network cannot work normally for a long time.

SUMMARY

The present invention provides a rendezvous point convergence method and apparatus, which can solve a problem that an entire network cannot work normally for a long time because a network device cannot send a candidate RP advertisement message to a BSR when the network device served as an RP is entirely faulty.

To achieve the foregoing objectives, the present invention adopts the following technical solutions:

In a first aspect, the present invention provides a rendezvous point convergence method, including:

receiving, by a first node, a bootstrap message sent by a bootstrap router BSR, where Holdtime of an original working rendezvous point RP carried in the bootstrap message is 0; and disabling, by the first node, the original working RP and enabling a candidate RP as a new working RP according to the bootstrap message.

Optionally, before the receiving, by the first node, the bootstrap message sent by the BSR, the method further includes:

sending, by the first node, a notification message to the BSR when detecting that a route of the original working rendezvous point RP is unreachable, where the notification message is used to notify the BSR that the original working RP is in an abnormal state, and the first node is a network node adjacent to the original working RP and can detect whether the route of the original working RP is reachable; and the receiving, by the first node, the bootstrap message sent by the BSR includes:

receiving, by the first node, the bootstrap message that is sent by the BSR according to the notification message.

Optionally, the sending, by the first node, the notification message to the BSR includes: sending, by the first node, the notification message to an adjacent network node, so that the notification message is forwarded by the adjacent network node to the BSR; and the receiving, by the first node, the bootstrap message sent by the BSR includes: receiving, by the first node, the bootstrap message forwarded by the adjacent network node.

Optionally, the sending, by the first node, the notification message to the BSR when detecting that the route of the original working rendezvous point RP is unreachable includes: starting, by the first node, a first timer when detecting that the route of the original working rendezvous point RP is unreachable, where the first timer is used to count time for the original working RP; and sending, by the first node, the notification message to the BSR when the first timer times out and the route of the original working RP keeps in an unreachable state within a timing period of the first timer.

Optionally, the notification message includes address information of the first node and address information of the original working RP; and the sending, by the first node, the notification message to the BSR includes: sending the notification message to an adjacent second node, so that the second node performs reverse path forwarding RPF check according to the address information of the first node; and forwarding, by the second node, the notification message to an adjacent node if the RPF check passes, so that the notification message is sent to the BSR through multiple times of forwarding of network nodes in a current network.

Optionally, if the second node and the original working RP are adjacent nodes, a second timer is started when the second node detects that the route of the original working RP is unreachable, where the second timer is used to count time for the original working RP, and a timing period of the second timer is longer than the timing period of the first timer; and Optionally, after the RPF check performed by the second node passes, the method further includes: deleting the second timer.

In a second aspect, the present invention further provides a rendezvous point convergence method, including:

generating a bootstrap message when determining that a route of an original working rendezvous point RP is unreachable, where Holdtime of the original working RP carried in the bootstrap message is 0; and sending the bootstrap message to each network node in a current network, so that each network node disables the original working RP and enables a candidate RP as a new working RP.

In a first possible implementation manner, the rendezvous point convergence method further includes: collecting RP information and sending the RP information to all network nodes in the current network through broadcast, where the RP information includes a candidate RP set and a priority of each candidate RP in the candidate RP set.

With reference to the second aspect or the first possible implementation manner of the second aspect, in a second possible implementation manner, the determining that the route of the original working rendezvous point RP is unreachable includes: when receiving a notification message sent by a network node in the current network, determining that the route of the original working RP is unreachable, where the notification message is used to notify a bootstrap router (BSR) that the original working RP is in an abnormal state; or determining, according to a convergence condition of the route, that the route of the original working rendezvous point RP is unreachable.

In a third aspect, the present invention further provides a network node, including:

a receiver, configured to receive a bootstrap message sent by a bootstrap router BSR, where Holdtime of an original working rendezvous point RP carried in the bootstrap message is 0; and a processor, configured to disable the original working RP and enable a candidate RP as a new working RP according to the bootstrap message received by the receiver.

Optionally, the network node further includes: a transmitter, configured to send a notification message to the BSR when the network node detects that a route of the original working rendezvous point RP is unreachable, where the notification message is used to notify the BSR that the original working RP is in an abnormal state, and the network node is a network node adjacent to the original working RP and can detect whether the route of the original working RP is reachable; and the receiver is specifically configured to receive the bootstrap message that is sent by the BSR according to the notification message.

Optionally, the transmitter is specifically configured to send the notification message to an adjacent network node, so that the notification message is forwarded by the adjacent network node to the BSR; and the receiver is specifically configured to receive the bootstrap message forwarded by the adjacent network node.

Optionally, the processor is configured to start a first timer when it is detected that the route of the original working rendezvous point RP is unreachable, where the first timer is used to count time for the original working RP; and the transmitter is configured to send the notification message to the BSR when the first timer times out and the route of the original working RP keeps in an unreachable state within a timing period of the first timer.

Optionally, the notification message sent by the transmitter includes address information of the network node and address information of the original working RP; the transmitter is specifically configured to send the notification message to an adjacent second node, so that the second node performs reverse path forwarding RPF check according to the address information of the network node; and the second node forwards the notification message to an adjacent node if the RPF check passes, so that the notification message is sent to the BSR through multiple times of forwarding of network nodes in a current network.

Optionally, the processor is further configured to delete the first timer after the receiver receives the bootstrap message sent by the BSR.

In a fourth aspect, the present invention further provides a bootstrap router (BSR), including:

a processor, configured to generate a bootstrap message when it is determined that a route of an original working rendezvous point RP is unreachable, where Holdtime of the original working RP carried in the bootstrap message is 0; and a transmitter, configured to send the bootstrap message generated by the processor to each network node in a current network, so that each network node disables the original working RP and enables a candidate RP as a new working RP.

In a first possible implementation manner, the BSR further includes:

a receiver, configured to collect RP information, where the RP information includes a candidate RP set and a priority of each candidate RP in the candidate RP set; and the transmitter is further configured to send the RP information collected by the receiver to all network nodes in the current network through broadcast.

With reference to the fourth aspect or the first possible implementation manner of the fourth aspect, in a second possible implementation manner, the receiver is further configured to receive a notification message sent by a network node in the current network, where the notification message is used to notify the BSR that the original working RP is in an abnormal state, and the network node is a network node adjacent to the original working RP and can detect whether the route of the original working RP is reachable; and the processor is further configured to, when the receiver receives the notification message, determine that the route of the original working RP is unreachable.

With the rendezvous point convergence method and apparatus provided in the present invention, when a route of an original working RP is unreachable, a BSR can send a bootstrap message to each network node in a current network to instruct each network node to disable the original working RP and enable a candidate RP as a new working RP. By adopting the rendezvous point convergence method provided in the embodiments of the present invention, when a network device served as an original working RP is entirely faulty (for example, the network device restarts, or all interfaces of the network device are faulty), RP convergence can be performed in time, and a candidate RP is enabled as a new working RP, so as to ensure normal working of an entire network.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
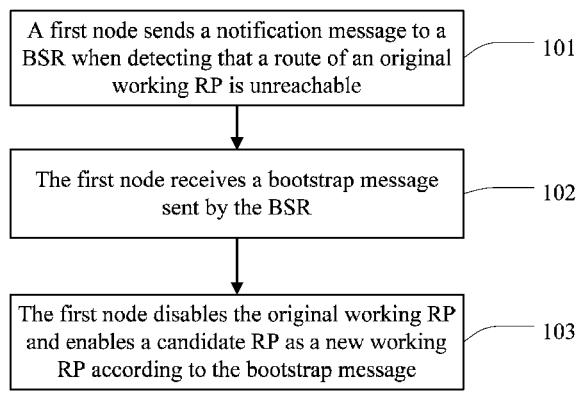
FIG. 1 is a schematic flowchart of a rendezvous point convergence method according to Embodiment 1 of the present invention.

This embodiment of the present invention provides an RP convergence method. As shown in FIG. 1, the method includes:

101. A first node sends a notification message to a BSR when detecting that a route of an original working RP is unreachable, where the notification message is used to notify the BSR that the original working RP is in an abnormal state, and the first node is a network node adjacent to the original working RP and can detect whether the route of the original working RP is reachable.

Specifically, if the first node and the BSR are adjacent, the first node may send the notification message to the BSR directly; and if the first node and the BSR are not adjacent, the first node may send the notification message to an adjacent network node, and the notification message is forwarded by the adjacent network node to the BSR.

The present invention provides two scenarios. In one scenario, the BSR may perceive, according to a convergence condition of the route, that the route of the original working RP is unreachable. In this case, the BSR does not need to receive the notification message sent by the first node. Therefore, step 101 is an optional step in the present invention.

102. The first node receives a bootstrap message sent by the BSR, where Holdtime of the original working RP carried in the bootstrap message is 0.

Specifically, after the BSR determines, according to the notification message sent by the first node, that the route of the original working RP is unreachable, the BSR may send a bootstrap message to each network node in a current network, where Holdtime of the original working RP carried in the bootstrap message is 0, to indicate that the original working RP times out.

103. The first node disables the original working RP and enables a candidate RP as a new working RP according to the bootstrap message.

It should be noted that the method provided in this embodiment is applicable to a PIM network, especially to a PIM-SM network. Network nodes (including the first node and the BSR in this embodiment) in the PIM-SM network may be routers, or may be switches, which is not limited herein.

With the rendezvous point convergence method provided in this embodiment of the present invention, when a route of an original working RP is unreachable, a BSR can send a bootstrap message to each network node in a current network in time to instruct each network node to disable the original working RP and enable a candidate RP as a new working RP. By adopting the rendezvous point convergence method provided in the embodiment of the present invention, when a network device served as an original working RP is entirely faulty (for example, the network device restarts, or all interfaces of the network device are faulty), each network node in a network can perform RP convergence in time and enable a candidate RP as a new working RP to ensure normal working of the entire network.

Embodiment 2

Figure 2:
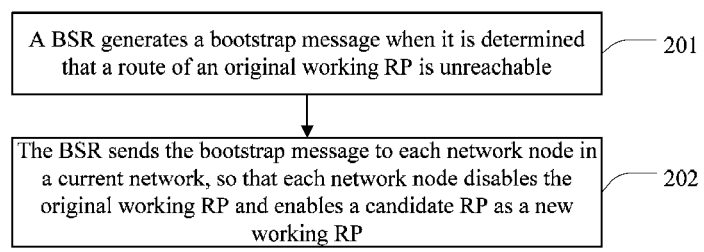
FIG. 2 is a schematic flowchart of a rendezvous point convergence method according to Embodiment 2 of the present invention.

This embodiment of the present invention provides an RP convergence method. As shown in FIG. 2, the method includes:

201. A BSR generates a bootstrap message when it is determined that a route of an original working RP is unreachable, where Holdtime of the original working RP carried in the bootstrap message is 0.

The method provided in this embodiment is primarily implemented by a BSR in a PIM-SM network. Generally, in the PIM-SM network, if an original working RP is faulty, the BSR may directly perceive, according to a convergence condition of a route, that the route of the original working RP is unreachable.

It should be noted that in a route convergence scenario, the BSR cannot directly perceive whether the route of the original working RP is reachable. In such a scenario, if the route of the original working RP is unreachable, a network node connected to the original working RP can send a notification message to the BSR, where the notification message is used to notify the BSR that the original working RP is in an abnormal state, so that the BSR determines that the route of the original working RP is unreachable after receiving the notification message.

202. The BSR sends the bootstrap message to each network node in a current network, so that each network node disables the original working RP and enables a candidate RP as a new working RP.

With the rendezvous point convergence method provided in this embodiment of the present invention, when a BSR detects that a route of an original working RP in a current network is unreachable, the BSR can send a bootstrap message to each network node in the network in time, so that each network node disables the original working RP and enables a candidate RP as a new working RP according to the bootstrap message. By adopting the rendezvous point convergence method provided in the embodiment of the present invention, when a network device served as an original working RP is entirely faulty (for example, the network device restarts, or all interfaces of the network device are faulty), a BSR can instruct, in time, each network node in a network to perform RP convergence in time and enable a candidate RP as a new working RP, to ensure normal working of the entire network.

Embodiment 3

Figure 3:
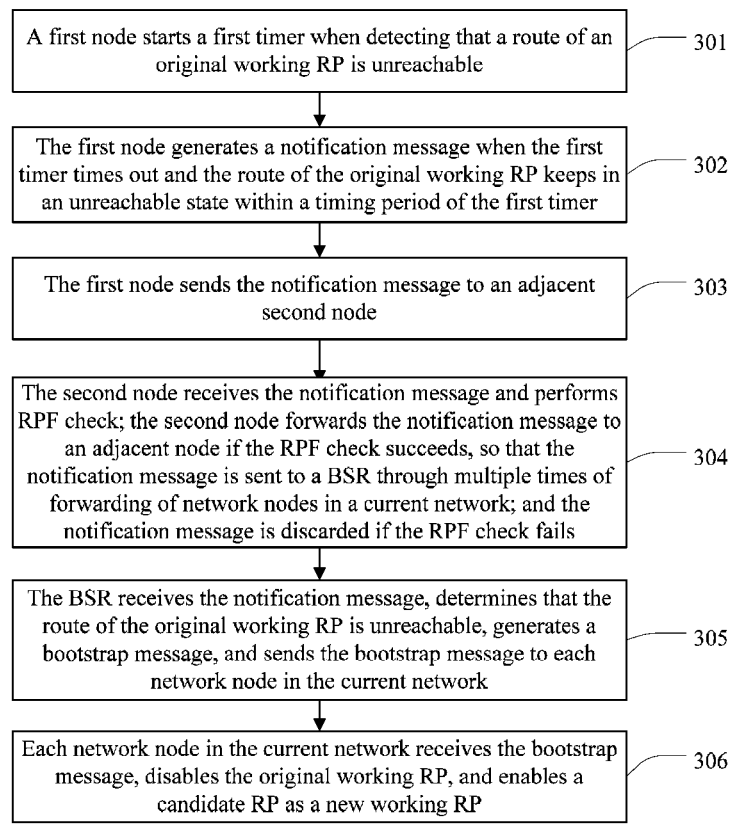
FIG. 3 is a schematic flowchart of a rendezvous point convergence method according to Embodiment 3 of the present invention.

On the basis of the embodiments shown in FIG. 1 and FIG. 2, this embodiment of the present invention further provides an RP convergence method. As shown in FIG. 3, the method includes:

301. A first node starts a first timer when detecting that a route of an original working RP is unreachable, where the first timer is used to count time for the original working RP. The first node is a network node adjacent to the original working RP and can detect whether the route of the original working RP is reachable.

302. The first node generates a notification message when the first timer times out and the route of the original working RP keeps in an unreachable state within a timing period of the first timer, where the notification message is used to notify a BSR that the original working RP is in an abnormal state. The notification message includes address information of the first node and address information of the original working RP.

303. The first node sends the notification message to an adjacent second node.

The second node is an adjacent network node of the first node.

304. The second node receives the notification message, obtains the address information of the first node from the notification message, and performs RPF (Reverse-path Forwarding, reverse path forwarding) check according to the address information of the first node; the second node forwards the notification message to an adjacent node if the RPF check passes, so that the notification message is sent to the BSR through multiple times of forwarding of network nodes in a current network; and the notification message is discarded if the RPF check fails.

If the second node and the original working RP are adjacent nodes, the second node can directly detect whether the route of the original working RP is reachable; the second node starts a second timer when detecting that the route of the original working RP is unreachable, where the second timer is used to count time for the original working RP, and the second timer times out later than the first timer; and after the second node receives the notification message, if RPF check passes, the second node deletes the second timer and forwards the notification message to an adjacent node.

305. The BSR receives the notification message, determines that the route of the original working RP is unreachable, generates a bootstrap message, and sends the bootstrap message to each network node in the current network, where Holdtime of the original working RP carried in the bootstrap message is 0.

It should be noted that in order to ensure reliability of an RP in a network, multiple candidate RPs are set when a PIM-SM network is established, and the candidate RPs may be network nodes in the current network, or may be dedicated RPs, which is not limited herein. The BSR is configured to collect RP information and send the RP information to all network nodes in the current network through broadcast, so that all the network nodes determine a candidate RP. The RP information includes a candidate RP set and a priority of each candidate RP in the candidate RP set. The candidate RP set is a set of all network nodes that can be served as candidate RPs in the current PIM-SM network, and the priorities of all candidate RPs are used to indicate a sequence of activating all the candidate RPs when the original working RP is in an abnormal state. For example, when the PIM-SIM network is established, a node 1, a node 2, and a node 3 may be set as candidate RPs (that is, the node 1, the node 2, and the node 3 form a candidate RP set), and priorities of the node 1, the node 2, and the node 3 are also set, for example, it may be set that the priority of the node 1 is highest and the priority of the node 3 is lowest. If the original working RP is in an abnormal state, a network node in the PIM-SM network disables the original working RP and enables the node 1 as a new working RP after learning that the original working RP is in an abnormal state; and if the node 1 is in an abnormal state subsequently, the network nodes in the PIM-SM network enable the node 2 as a new working RP.

In steps 301 to 305, the implementation process that BSR perceives that the original working RP is unavailable is described. The foregoing implementation process is applicable to a route convergence scenario, because in such a scenario, only an adjacent node of the original working RP can detect whether the route of the original working RP is reachable, and the BSR and other network nodes in the network cannot perceive a working state of the original working RP.

306. Each network node in the current network receives the bootstrap message, disables the original working RP, and enables a candidate RP as a new working RP.

Optionally, after receiving the bootstrap message sent by the BSR, the first node deletes the first timer and forwards the bootstrap message to other network nodes.

Figure 4:
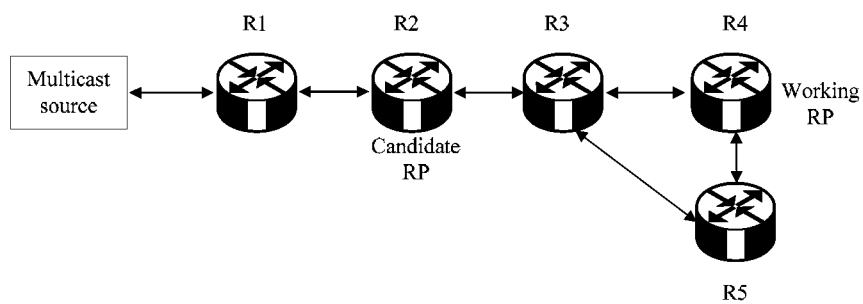
FIG. 4 is a schematic diagram of an application scenario of an example described in Embodiment 3 of the present invention.

To facilitate understanding, this embodiment is described by using an example with reference to a practical scenario. As shown in FIG. 4, R1, R2, . . . , and R5 are network nodes that form a PIM-SM network. R4 is a working RP in the current network, and is configured to respond to a join request of a network node, obtain a multicast data stream from a multicast source, and send the multicast data stream to network nodes in the current network through multicast; R1 is a BSR in the current network, and is configured to collect RP information and send the RP information to all network devices in the current network through broadcast; and R2 is a candidate RP of the current network, and can be served as a new working RP when R4 is faulty, so as to ensure normal communication of the current network.

FIG. 4 shows a PIM-SM network including a route convergence scenario. In such a scenario, for example, R3, R4, and R5 shown in FIG. 4 form a relatively independent internal route. When R4 (that is, a working RP) is faulty, only adjacent nodes (that is, R3 and R5 shown in FIG. 4) of R4 can perceive that a route of R4 is unreachable, and a BSR cannot directly perceive whether the route of the working RP is reachable.

According to the PIM-SM network shown in FIG. 4, the first node may be R3, or may be R5. Because in FIG. 4, R3 is closer to the BSR (R1) than R5, in this embodiment, that R3 is served as the first node is taken as an example for description. When R4 (that is, an original working node) is entirely faulty (for example, R4 restarts, or all interfaces of R4 are faulty), which causes that a route of R4 is unreachable, RP convergence may be implemented by using the following method in the current network:

S1. When R4 is entirely faulty, R3 and R5 detect that a route of R4 is unreachable, R3 starts a first timer, and R5 starts a second timer, where a timing period of the second timer is longer than a timing period of the first timer.

S2. The first timer of R3 times out, and the route of R4 keeps in an unreachable state within the timing period of the first timer, and R3 sends a notification message to R2 and R5, where the notification message includes address information of R3 and address information of the original working RP (that is, R4).

S3. R5 receives the notification message sent by R3, and performs RPF check according to the address information of R3 in the notification message; deletes the second timer if the check passes; and discards the notification message if the check fails.

It should be noted that the RPF check is performed to avoid a network congestion problem caused by repeated transmission of a same packet in a network. For example, if after R5 receives the notification message sent by R3, R5 receives the notification message forwarded by another network node, the notification message that is received again may be discarded through RPF check, thereby saving network bandwidth.

S4. R2 receives a notification message sent by R3 and performs RPF check according to the address information of R3 in the notification message; forwards the notification message to R1 if the check passes; and discards the notification message if the check fails.

S5. If R1 receives the notification message forwarded by R2 and determines that the route of R4 is unreachable, R1 generates a bootstrap message and sends the bootstrap message to R2, where the bootstrap message indicates that Holdtime of R4 is 0.

S6. If R2 receives the bootstrap message and detects that the Holdtime of R4 is 0, R2 disables R4, enables R2 as a new working RP, and forwards the bootstrap message to an adjacent network node, so that each network node in the current network can receive the bootstrap message.

Specifically, after receiving the bootstrap message, each network node in the current network disables R4 and enables R2 as a new working RP, thereby implementing RP convergence.

With the rendezvous point convergence method provided in this embodiment of the present invention, when a first node detects that a route of an original working RP is unreachable, the first node can initiate a notification to a BSR in time, so that the BSR sends a bootstrap message to each network node in a current network to instruct each network node to disable the original working RP and enable a candidate RP as a new working RP. By adopting the rendezvous point convergence method provided in the embodiment of the present invention, when a network device served as an original working RP is entirely faulty (for example, the network device restarts, or all interfaces of the network device are faulty), each network node in a network can perform RP convergence in time and enable a candidate RP as a new working RP, to ensure normal working of the entire network.

Embodiment 4

Figure 5:
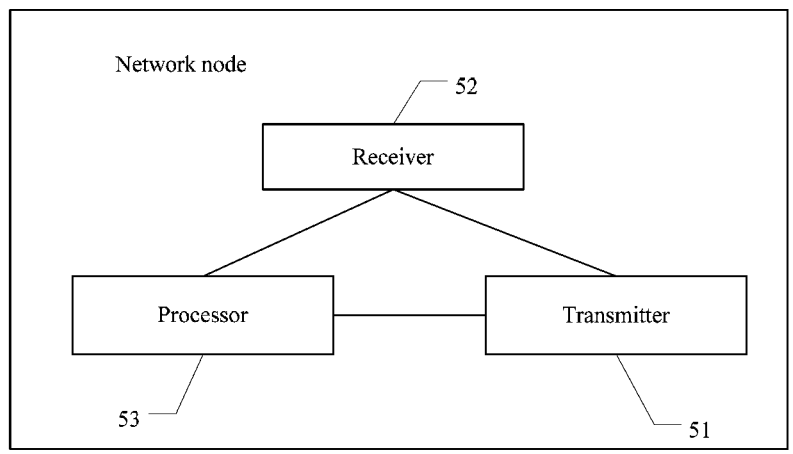
FIG. 5 is a structural block diagram of a network node according to Embodiment 4 of the present invention.

This embodiment of the present invention provides a network node, which can implement the method embodiments shown in FIG. 1 and FIG. 3. As shown in FIG. 5, the network node includes:

A transmitter 51 is configured to send a notification message to a bootstrap router BSR when the network node detects that a route of an original working rendezvous point RP is unreachable, where the notification message is used to notify the BSR that the original working RP is in an abnormal state, and the network node is a network node adjacent to the original working RP and can detect whether the route of the original working RP is reachable.

Based on the same reason in Embodiment 1, the transmitter 51 is an optional component of the network node.

A receiver 52 is configured to receive a bootstrap message sent by the BSR, where Holdtime of the original working RP carried in the bootstrap message is 0.

A processor 53 is configured to, according to the bootstrap message received by the receiver 52, disable the original working RP and enable a candidate RP as a new working RP.

Optionally, the transmitter 51 is specifically configured to send the notification message to an adjacent network node, so that the notification message is forwarded by the adjacent network node to the BSR; and the receiver 52 is specifically configured to receive the bootstrap message forwarded by the adjacent network node.

Optionally, the processor 53 is configured to start a first timer when it is detected that the route of the original working rendezvous point RP is unreachable, where the first timer is used to count time for the original working RP; and the transmitter 51 is configured to send the notification message to the bootstrap router BSR when the first timer times out and the route of the original working RP keeps in an unreachable state within a timing period of the first timer.

Optionally, the notification message sent by the transmitter 51 includes address information of the network node and address information of the original working RP; and the transmitter 51 is specifically configured to send the notification message to an adjacent second node, so that the second node performs reverse path forwarding (RPF) check according to the address information of the network node; and the second node forwards the notification message to an adjacent node if the RPF check passes, so that the notification message is sent to the BSR through multiple times of forwarding of network nodes in a current network.

Optionally, the processor 53 is further configured to delete the first timer after the receiver 52 receives the bootstrap message sent by the BSR.

With the network node provided in this embodiment of the present invention, when it is detected that a route of an original working RP is unreachable, a notification can be initiated to a BSR in time, so that the BSR sends a bootstrap message to each network node in a current network to instruct each network node to disable the original working RP and enable a candidate RP as a new working RP. By adopting the rendezvous point convergence method provided in the embodiment of the present invention, when a network device served as an original working RP is entirely faulty (for example, the network device restarts, or all interfaces of the network device are faulty), each network node in a network can perform RP convergence in time and enable a candidate RP as a new working RP, to ensure normal working of the entire network.

Embodiment 5

Figure 6:
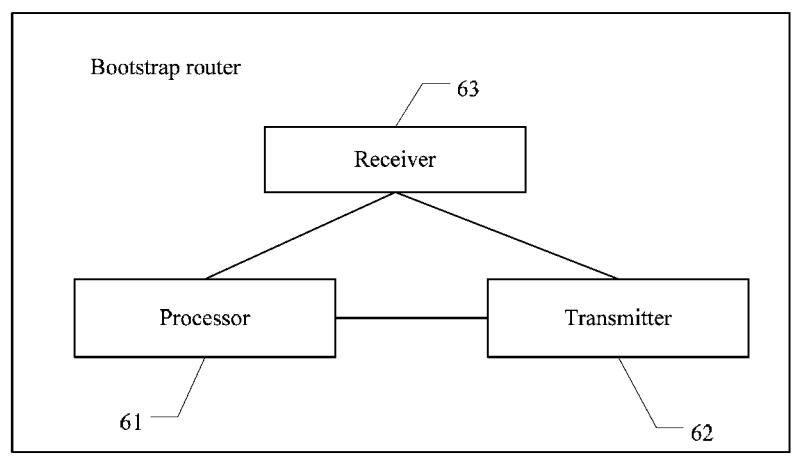
FIG. 6 is a structural block diagram of a bootstrap router according to Embodiment 5 of the present invention.

This embodiment of the present invention provides a bootstrap router BSR, which can implement the foregoing method embodiments. As shown in FIG. 6, the BSR includes:

a processor 61, configured to generate a bootstrap message when it is determined that a route of an original working rendezvous point RP is unreachable, where Holdtime of the original working RP carried in the bootstrap message is 0; and a transmitter 62, configured to send the bootstrap message generated by the processor to each network node in a current network, so that each network node disables the original working RP and enables a candidate RP as a new working RP.

Optionally, as shown in FIG. 6, the BSR further includes:

a receiver 63, configured to collect RP information, where the RP information includes a candidate RP set and a priority of each candidate RP in the candidate RP set; and:

the transmitter 62 is further configured to send the RP information collected by the receiver 63 to all network nodes in the current network through broadcast.

Optionally, the receiver 63 is further configured to receive a notification message sent by a network node in the current network, where the notification message is used to notify the BSR that the original working RP is in an abnormal state; and The processor 61 is further configured to, when the receiver 63 receives the notification message, determine that the route of the original working RP is unreachable.

With the BSR provided in this embodiment of the present invention, when it is detected that a route of an original working RP in a current network is unreachable, a bootstrap message can be sent to each network node in the network in time, so that each network node disables the original working RP and enables a candidate RP as a new working RP according to the bootstrap message. By adopting the rendezvous point convergence method provided in the embodiment of the present invention, when a network device served as an original working RP is entirely faulty (for example, the network device restarts, or all interfaces of the network device are faulty), a BSR can instruct, in time, each network node in a network to perform RP convergence in time and enable a candidate RP as a new working RP, to ensure normal working of the entire network.

Through the foregoing description of the embodiments, persons skilled in the art may clearly understand that the present invention may be implemented by software plus necessary universal hardware, and definitely may also be implemented by hardware, but in many cases, the software implementation is preferred. Based on such understanding, the technical solutions of the present invention essentially, or the part contributing to the prior art may be implemented in the form of a software product. The computer software product is stored in a readable storage medium, for example, a floppy disk, a hard disk, or an optical disk of a computer, and includes several instructions for instructing a computer device (which may be a personal computer, a server, or a network device) to perform the methods described in the embodiments of the present invention.

The foregoing description is merely about the specific embodiments of the present invention, but is not intended to limit the protection scope of the present invention. Any variation or replacement readily figured out by persons skilled in the art within the technical scope disclosed in the present invention shall all fall within the protection scope of the present invention. Therefore, the protection scope of the present invention shall be subject to the protection scope of the claims.

What is claimed is:

1. A rendezvous point (RP) convergence method, wherein the method is applied in a protocol independent multicast-sparse mode, and the method comprises:
    starting, by a first node, a first timer when detecting that a route of an original working RP is unreachable, wherein the first timer is used to count time for the original working RP;
    sending, by the first node, a notification message to a second node when the first timer times out and the route of the original working RP keeps being in an unreachable state within a timing period of the first timer; wherein the notification message comprises address information of the first node and address information of the original working RP;
    forwarding, by the second node, the notification message to an adjacent node if a reverse path forwarding (RPF) check performed by the second node passes, so that the notification message is sent to a bootstrap router (BSR) through multiple times of forwarding of network nodes in a current network;
    upon the forwarding the notification message, receiving, by the first node, a bootstrap message sent by the BSR, wherein Holdtime of the original working RP carried in the bootstrap message is 0; and
    disabling, by the first node, the original working RP and enabling a candidate RP as a new working RP according to the bootstrap message;
    wherein:
    if the second node and the original working RP are adjacent nodes, a second timer is started when the second node detects that the route of the original working RP is unreachable, wherein the second timer is used to count time for the original working RP, and a timing period of the second timer is longer than the timing period of the first timer.

2. The method according to claim 1, wherein
    after the RPF check performed by the second node passes, the method further comprises: deleting, by the second node, the second timer.

3. A rendezvous point (RP) convergence system, comprising a first node, a second node, and a bootstrap router (BSR), wherein the first node comprises:
    a memory comprising instructions; and
    a processor coupled to the memory, wherein the processor is configured to execute the instructions to:
    start a first timer when detecting that a route of an original working RP is unreachable, wherein the first timer is used to count time for the original working RP;
    send a notification message to a second node when the first timer times out and the route of the original working RP keeps being in an unreachable state within a timing period of the first timer; wherein the notification message comprises address information of the first node and address information of the original working RP;
    receive a bootstrap message sent by the BSR, wherein Holdtime of the original working RP carried in the bootstrap message is 0; and
    disable the original working RP and enable a candidate RP as a new working RP according to the bootstrap message;
    the second node is configured to receive the notification message sent by the first node, perform a reverse path forwarding (RPF) check, and forward the notification message to an adjacent node if the RPF passes, so that the notification message is sent to the BSR through multiple times of forwarding of network nodes in a current network;
    the BSR is used to receive the notification message, generate the bootstrap message, and send the bootstrap message to the first node;
    wherein:
    if the second node and the original working RP are adjacent nodes, a second timer is started when the second node detects that the route of the original working RP is unreachable, wherein the second timer is used to count time for the original working RP, and a timing period of the second timer is longer than the timing period of the first timer.

4. The rendezvous point convergence system according to claim 3, wherein: the second node is further configured to delete the second timer after the RPF check performed by the second node passes.

* * * * *